(12) United States Patent
Chien et al.

(10) Patent No.: US 9,836,764 B2
(45) Date of Patent: Dec. 5, 2017

(54) ELECTRONIC DEVICE AND COMPUTER PRODUCT

(71) Applicant: HiTi Digital, Inc., New Taipei (TW)

(72) Inventors: Hung-Chan Chien, New Taipei (TW); Shi-Kai Lin, New Taipei (TW); Meng-Wei Su, New Taipei (TW); Fu-Anita Huang, New Taipei (TW)

(73) Assignee: HiTi Digital, Inc., New Taipei (TW)

( * ) Notice: Subject to any disclaimer, the term of this patent is extended or adjusted under 35 U.S.C. 154(b) by 408 days.

(21) Appl. No.: 14/523,941

(22) Filed: Oct. 26, 2014

(65) Prior Publication Data

US 2015/0116510 A1    Apr. 30, 2015

Related U.S. Application Data

(60) Provisional application No. 61/897,231, filed on Oct. 30, 2013.

(30) Foreign Application Priority Data

Sep. 11, 2014    (TW) .............................. 103131399 A

(51) Int. Cl.
*G06Q 30/02*    (2012.01)

(52) U.S. Cl.
CPC ......... *G06Q 30/0267* (2013.01); *G06Q 30/02* (2013.01); *G06Q 30/0207* (2013.01)

(58) Field of Classification Search
CPC .................................................. G06Q 30/00
USPC ............ 705/14.26; 358/540; 400/62; 725/23
See application file for complete search history.

(56) References Cited

U.S. PATENT DOCUMENTS

| | | | | |
|---|---|---|---|---|
| 9,329,762 | B1* | 5/2016 | Schultz | G06F 3/04845 |
| 2005/0147440 | A1* | 7/2005 | Nakanishi | B41J 2/17546 400/62 |
| 2006/0013630 | A1 | 1/2006 | Silverbrook et al. | |
| 2007/0019261 | A1* | 1/2007 | Chu | G06Q 30/02 358/540 |
| 2008/0032739 | A1* | 2/2008 | Hoodbhoy | G06Q 10/06 455/556.2 |
| 2009/0171775 | A1* | 7/2009 | Cashion, Jr. | G06Q 30/02 705/14.26 |
| 2010/0198683 | A1 | 8/2010 | Aarabi | |

(Continued)

FOREIGN PATENT DOCUMENTS

| | | |
|---|---|---|
| CN | 1832571 A | 9/2006 |
| CN | 101620715 A | 1/2010 |

(Continued)

*Primary Examiner* — Marilyn G Macasiano
(74) *Attorney, Agent, or Firm* — CKC & Partners Co., Ltd.

(57) ABSTRACT

The present invention provides an electronic device and computer program product, and the computer program product includes an application that is loaded into the electronic device to perform the method as follows. After a user logs into his account, the selected mobile advertisement is accepted and then played; when the mobile advertisement is selected or played, it offers a record of promotion information to be stored in the user account, the promotion information includes at least one of the following: points, a voucher, and a discount coupon, in which the point is utilized to redeem goods. At least one photo of the user account is selected, so that the portable printer can print this photo through a wireless transmission unit of the electronic device.

14 Claims, 12 Drawing Sheets

(56) References Cited

U.S. PATENT DOCUMENTS

2013/0110641 A1    5/2013  Ormont et al.
2013/0174191 A1*   7/2013  Thompson, Jr. ... G06Q 30/0207
                                                      725/23

FOREIGN PATENT DOCUMENTS

| CN | 101663680 A | 3/2010 |
| CN | 102204243 A | 9/2011 |
| CN | 202196445 U | 4/2012 |
| CN | 102855104 A | 1/2013 |
| TW | 201329756 A | 7/2013 |

* cited by examiner

ELECTRONIC DEVICE AND COMPUTER PRODUCT

RELATED APPLICATIONS

This application claims priority to U.S. Provisional Ser. No. 61/897,231, filed Oct. 30, 2013, and Taiwan Application Serial Number 103131399, filed Sep. 11, 2014, which is herein incorporated by reference.

BACKGROUND

Field of Invention

The present invention relates to a device and a method. More particularly, the present invention relates to an electronic device and a computer product.

Description of Related Art

In the era of smart phone, due to the contact and communication functionality of the mobile phones, mobile phones with mega-pixel cameras play an important role in certain social phenomenon and human behaviors.

If a camera phone or a digital camera is used in connection with a recently-developed portable printer, the consumers, no matter where they are, may, as desired, instantly transmit the photographs stored in the mobile phone to the portable printer so as to print the photograph in real-time.

In view of the mobile digital life prompted by the smart mobile devices, as well as the busy and dull characteristics of modern life, those skilled in the art sought vainly for a suitable solution to offer versatile and innovative entertaining functionalities of the image. In view of the foregoing, there exist problems and disadvantages in the related art for further improvement however, those skilled in the art sought vainly for a suitable solution. In order to solve or circumvent above problems and disadvantages, there is an urgent need in the related field to provide means for creating a more interesting and versatile image entertainment life.

SUMMARY

The following presents a simplified summary of the disclosure in order to provide a basic understanding to the reader. This summary is not an extensive overview of the disclosure and it does not identify key/critical components of the present invention or delineate the scope of the present invention. Its sole purpose is to present some concepts disclosed herein in a simplified form as a prelude to the more detailed description that is presented later.

In one aspect, the present disclosure provides an electronic device and a computer product to solve or circumvent aforesaid problems and disadvantages.

According to the present disclosure, the electronic device comprises a wireless transmission unit, a storage unit, a processing unit, an input unit, and a display unit, wherein the processing is unit electrically connected to the storage unit, the wireless transmission unit, the input unit, and the display unit. The storage unit stores at least one photograph and an application; the processing unit is configured to execute the application, and after a user logs into a user account associated with the application, the processing unit uses the wireless transmission unit to command a portable printer to print the photograph according to the photograph selected by the user account; the input unit is configured to receive a selection of a mobile advertisement; the display unit is configured to play the mobile advertisement, wherein when the mobile advertisement is selected or played, the application stores a record of promotion information for the user account, wherein the promotion information comprises at least one of a point, a voucher and a discount coupon, wherein the point is utilized to redeem goods.

In one embodiment, the application further adds up the point according to a number of printing times of the portable printer.

In one embodiment, the processing unit uses the wireless transmission unit to command the portable printer to print the voucher or discount coupon.

In one embodiment, after the photograph is printed, the processing unit uses the wireless transmission unit to back-up the photograph to a cloud server.

In one embodiment, the cloud server is connected with an identification database to identify at least one of the following: face, skin texture, figure shape, and one or more objects in the photograph, so as to provide the user account a corresponding mobile advertisement.

In one embodiment, the when the photograph selected by the user account tags at least one friend account, the application provides the photograph to the friend account, and the cloud server provides the corresponding mobile advertisement to the friend account.

In one embodiment, when the input unit receives an editing message, the application loads the photograph into an editing area to execute the a corresponding image editing, and the processing unit uses the wireless transmission unit to back-up the photograph together with the image editing to a cloud server.

In one embodiment, the electronic device further comprises an orientation detector, wherein the orientation detector is electrically connected to the processing unit. After the photograph is loaded into the editing area, and when the input unit receives a selection of one or more objects and the orientation detector senses a shaking, the one or more objects are randomly arranged on the photograph, so that the portable printer prints the photograph with the one or more objects.

In one embodiment, after the photograph is loaded into the editing area, the input unit receive a selection of an image effect and an input of a text, the application converts the text into a two-dimensional bar code, and further overlays the image effect, the two-dimensional bar code, and the photograph into a picture, so that portable printer prints the picture.

In one embodiment, the number of the photograph stored by the storage unit is at least two, the input unit receives a collaging message, wherein the collaging message is used to select a set of photographs from the plurality of photographs and collage the set of photographs into a picture, so that portable printer prints the picture.

On the other hand, the computer product according to the present disclosure comprises an application, and an electronic device loads the application to execute a operation method, in which the operation method comprises: after a user account is logged in, he or she will receive a selection of a mobile advertisement; when the mobile advertisement is selected or played, a record of promotion information is stored in the user account, wherein the promotion information comprising at least one of a point, a voucher and a discount coupon, and the point is utilized to redeem goods; and further according to at least one photograph selected by the user account, using a wireless transmission unit of the electronic device to command the portable printer to print the at least one photograph.

In one embodiment, the operation method further comprises: adding up the points according to a number of printing times of the portable printer.

In one embodiment, the operation method further comprises: using the wireless transmission unit to command the portable printer to print the voucher or the discount coupon.

In one embodiment, the operation method further comprises: using the wireless transmission unit to back-up the photograph to a cloud server after the photograph is printed.

In one embodiment, the cloud server is connected with an identification database to identify at least one of the following: face, skin texture, figure shape, and one or more objects in the photograph, so as to provide the user account a corresponding mobile advertisement.

In one embodiment, the operation method further comprises: when the photograph selected by the user account tags at least one friend account, using the friend account to provide the photograph, so that the cloud server provides the corresponding mobile advertisement to the friend account.

In one embodiment, the operation method further comprises: loading the photograph into an editing area to execute a corresponding image editing, according to an editing message, and using the wireless transmission unit to back-up the photograph together with the image editing to a cloud server.

In one embodiment, the operation method further comprises: after the photograph is loaded into the editing area, and when a selection of one or more objects is received and a shaking is sensed, randomly arranging the one or more objects on the photograph, so that the portable printer prints the photograph with the one or more objects.

In one embodiment, the operation method further comprises: receiving a selection of an image effect and an input of a text, after the photograph is loaded into editing area; converting the texts into a two-dimensional bar code; and further overlaying the image effect, the two-dimensional bar code and the photograph into a picture, so that the portable printer prints the picture.

In one embodiment, the number of the photograph stored in the storage unit is at least two, and the operation method further comprises: receiving a collaging message, wherein the collaging message is used to select a set of photographs from the plurality of photographs and collage the set of photographs into a picture, so that the portable printer prints the picture.

In view of the foregoing, the technical solutions of the present disclosure star from the aim of creating versatile and innovative image entertainment functionalities, and accordingly they give the consumer a bran-new user experiences. After the installation of the application of the present disclosure, the present application may not only control a portable printer to print the photographs but also lead the user to experience a more interesting and versatile image entertainment life.

Many of the attendant features will be more readily appreciated, as the same becomes better understood by reference to the following detailed description considered in connection with the accompanying drawings.

BRIEF DESCRIPTION OF THE DRAWINGS

The present description will be better understood from the following detailed description read in light of the accompanying drawing, wherein.

DETAILED DESCRIPTION

Figure 1:
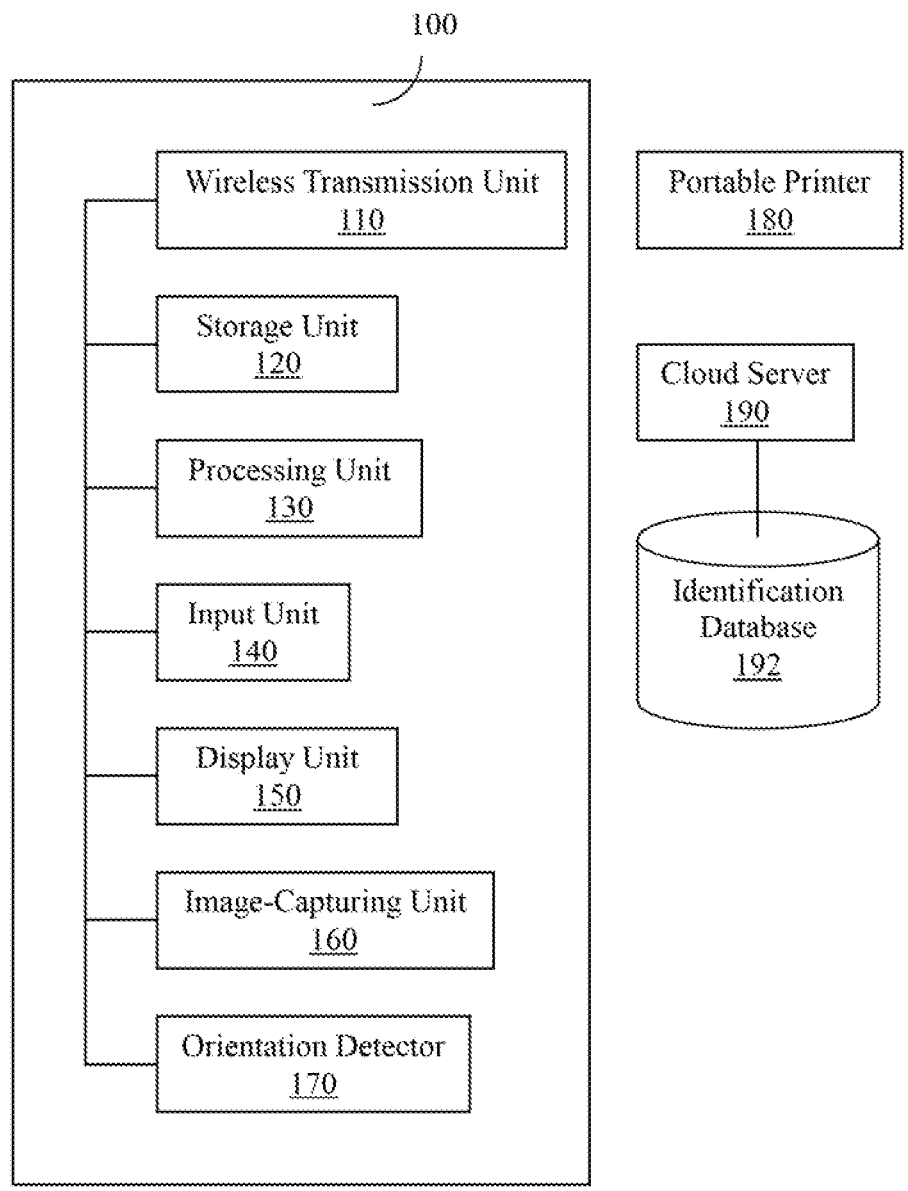
FIG. 1 is a block diagram of an electronic device according to one embodiment of the present disclosure.

In the following detailed description, for purposes of explanation, numerous specific details are set forth in order to attain a thorough understanding of the disclosed embodiments. In accordance with common practice, like reference numerals and designations in the various drawings are used to indicate like elements/parts. Moreover, well-known elements or method steps are schematically shown or omitted in order to simplify the drawing and to avoid unnecessary limitation to the claimed invention.

Unless otherwise required by the context, it will be understood that singular terms shall include plural forms of the same and plural terms shall include the singular.

Through the present specification and the annexed claims, the description involving the "electrical connection" refers to the cases where one component is electrically connected to another component indirectly via other component(s), or one component electrically connected to another component directly without any other component.

Due to the prevalence of the network communication, a computer software, in addition to being stored on a recording medium, can also be directly provided by being transmitted via the network communication without the use of a recording medium. Hence, one aspect of the present invention is directed to a computer product, which has a computer (e.g., a tablet computer, smart phone, smart camera, and similar electronic devices)-readable application (APP) loaded thereon, in which the computer product is not limited to any physical form, and the smart camera is referred to as a camera which has an operating system that supports the installation and the execution of said application; such as a camera that supports an Android or iPhone App. The application is loaded by the electronic device to execute the operation method; it should be noted that the present application is compatible with all sorts of operating systems, so that all kinds of electronic devices (e.g., smart phones) can connect with the portable printer and enjoy the image entertainment where the life can be recorded anytime, anywhere. The implementations of this operation method is discussed hereinbelow in connection with the basic structure of the electronic device illustrated in FIG. 1 and the process steps provided in FIG. 2 to FIG. 12.

FIG. 1 is a block diagram of an electronic device according to one embodiment of the present disclosure. The electronic device 100 can be a mobile phone, tablet computer, notebook, or other electronic products. As illustrated in FIG. 1, the electronic device 100 comprises a wireless transmission unit 110, a storage unit 120, a processing unit 130, an input unit 140, a display unit 150, and an image-capturing unit 160. For example, the wireless transmission unit 110 can be a mobile wireless transceiver (e.g., a Wi-Fi module), the storage unit 120 can be a hard drive, flash memory, or devices of the like; the processing unit 130 can be a central processing unit, microcontroller or other processing components; the input unit 140 can be a keyboard, touch-control device or other processing components; the display unit 150 can be a liquid crystal display, electronic paper display, or any other display. Further, the input unit 140 and the display unit 150 can be integrated into a touch-control screen. The image-capturing unit 160 can be a built-in image-capturing component or am external image-capturing device for the user to take a photo.

In structure, the processing unit 130 is electrically connected to the wireless transmission unit 110, the storage unit 120, the input unit 140, the display unit 150, and the image-capturing unit 160, wherein the storage unit 120 stores at least one photograph and an application, and the processing unit 130 is capable of executing the application. In operation, the user may first register a user account, and after the user logs into the user account associated with the application, the processing unit 130 uses the wireless transmission unit 110 to command the portable printer 180 to print a photograph selected by the user account. To take of both the user's health and the duty for the society, in one embodiment, the portable printer 180 can uses the environmental-friendly, non-toxic dye sublimation printing technique, so as to do our part for protecting the user's health and the earth.

Moreover, the user may use the input unit 140 to select a mobile advertisement, so that the input unit 140 receives the selection of a mobile advertisement, and the display unit 150 plays the mobile advertisement, wherein when the mobile advertisement is selected or played, the application stores a record of promotion information in the user account, in which the promotion information comprises at least one of a point, voucher and discount coupon, and the point is utilized to redeem goods, such as the virtual goods (e.g., stickers) in the application, the consumables (e.g., the color ribbons, photo papers, etc.) of portable printer 180 or any other goods. In this way, the user may obtain a favor by simply viewing the advertisement, which is very convenient for the user.

To urge the user to use the portable printer 180 more often, the application may further add up the point according to number of printing times of the portable printer 180. In this way, the user can redeem more goods (such as, but not limited to, certain amounts of consumables, like the color ribbons, photo papers) by printing more photographs, so as to reduce the monetary burden of the user while enjoying the image life.

On the other hand, if the user wants to print the above-mentioned voucher or discount coupon, he/she may use the application to execute the printing function, so that the processing unit 130 uses the wireless transmission unit 110 to command the portable printer 180 to print the voucher or discount coupon. In this way, the user may have a physical voucher or discount coupon to be used in a physical store, in which the voucher can be used in exchange for goods/service, and the discount coupon can be used to purchase goods/service at a lower than regular price.

After photograph is printed by the portable printer 180, the processing unit 130 uses the wireless transmission unit 110 to back-up the photograph to a cloud server 190. In this way, the present invention combines the image products, cloud service and Internet resources to create a more interesting, versatile image entertainment life, so that the user may use the application to connect to the cloud server 190 to review a cloud album.

Further, the cloud server 190 is connected to an identification database 192, which is configured to identify at least one of the following: face, skin texture, figure shape, and one or more objects, so as to provide the user account a mobile advertisement corresponding to the result of the identification. For example, if a brand handbag is present in the photograph, the cloud server 190 can provide the user an advertisement related to luxury goods, which may better fit the users need or interest.

In the settings of travel or gathering, after taking the photograph, the user can manually tags a friend account, or the application can identify the face in the photograph and automatically tag a friend account corresponding to the face identified; no matter how the tagging is done, when the photograph selected by the user account has been tagged with at least one friend account, the application can use the push notification technique to provide the photograph to the friend account; on the other hand, the cloud server 190 may provide a corresponding mobile advertisement to the friend account. For example, the cloud server 190 may provide an advertisement to the electronic device used by the friend account via push notification based on the token of the mobile phone or the tablet used to log into the friend account. In this way, the friend of the user can receive the promotion by viewing the advertisement.

Further, the application according to the present disclosure comprises abundant effect editors for performing post-processing to the photograph thereby creating a one and only photograph that manifests the unique style of the user. The user may use the input unit 140 to input an editing message, and when the input unit receive the editing message, the application loads the photograph into an editing area to execute the corresponding image editing, and the processing unit 130 uses the wireless transmission unit 110 to back-up the photograph together with the image editing to a cloud server 190.

In FIG. 1, the electronic device may also comprise an orientation detector 170, such as, a gravity sensor, gyroscope, etc. In structure, the orientation detector 170 is electrically connected to the processing unit 130. After the photograph is loaded into the editing area, the application provides various objects (such as snowflake, star, heart) which can be selected by the user; the user may use the input unit 140 to select one or more objects, and then the input unit 140 receives the selection of the one or more objects; next, when the orientation detector 170 senses a shaking, the application randomly arranges the one or more objects on the photograph, so that the portable printer 180 prints the photograph together with the one or more objects thereon.

In one embodiment, after the photograph is loaded into the editing area, the application offers several image effects (e.g., brush for painting the background, ornaments for decorating the image), and the text-input function, so that the user may use the input unit 140 to selected the desired image effect and the text to be inputted, and then the input unit 140 receives the selection of the image effect and the input of a text, and the application converts the text into a two-dimensional bar code (QR Code), and further overlays the image effect, the two-dimensional bar code and the photograph as a picture, so as to allow the portable printer 180 to print the picture which can be used as a card or postcard. Moreover, the processing unit 130 can also use the wireless transmission unit 110 to back-up the picture to the cloud server 190.

If there are multiple photographs stored in the storage unit 120, the application allows the user to collage multiple photographs; the user can use the input unit 140 to input a collaging message, and the input unit 140 receives the collaging message, in which the collaging message is used to select a set of photographs from the plurality of photographs and collage the set of photographs into a picture, so that portable printer 180 prints the picture as a comic strip or a small card. Furthermore, the processing unit 130 can also use the wireless transmission unit 110 to back-up the picture to the cloud server 190.

To further explain the operation method executed by the present application, detailed process steps for implementing said operation method is provided hereinbelow with reference to FIG. 2 to FIG. 12, which are flow charts illustrating the methods of operation according to various embodiment of the present disclosure. As could be appreciated, the order in which the steps mentioned in these embodiments is performed, unless explicitly specified otherwise, could be adjusted as required, or some or all of the steps can be performed simultaneously. Regarding the hardware devices required for implementing these steps, they have been specifically described in the above-mentioned embodiments, and hence, detailed descriptions thereof are omitted herein for the sake of brevity.

Figure 2:
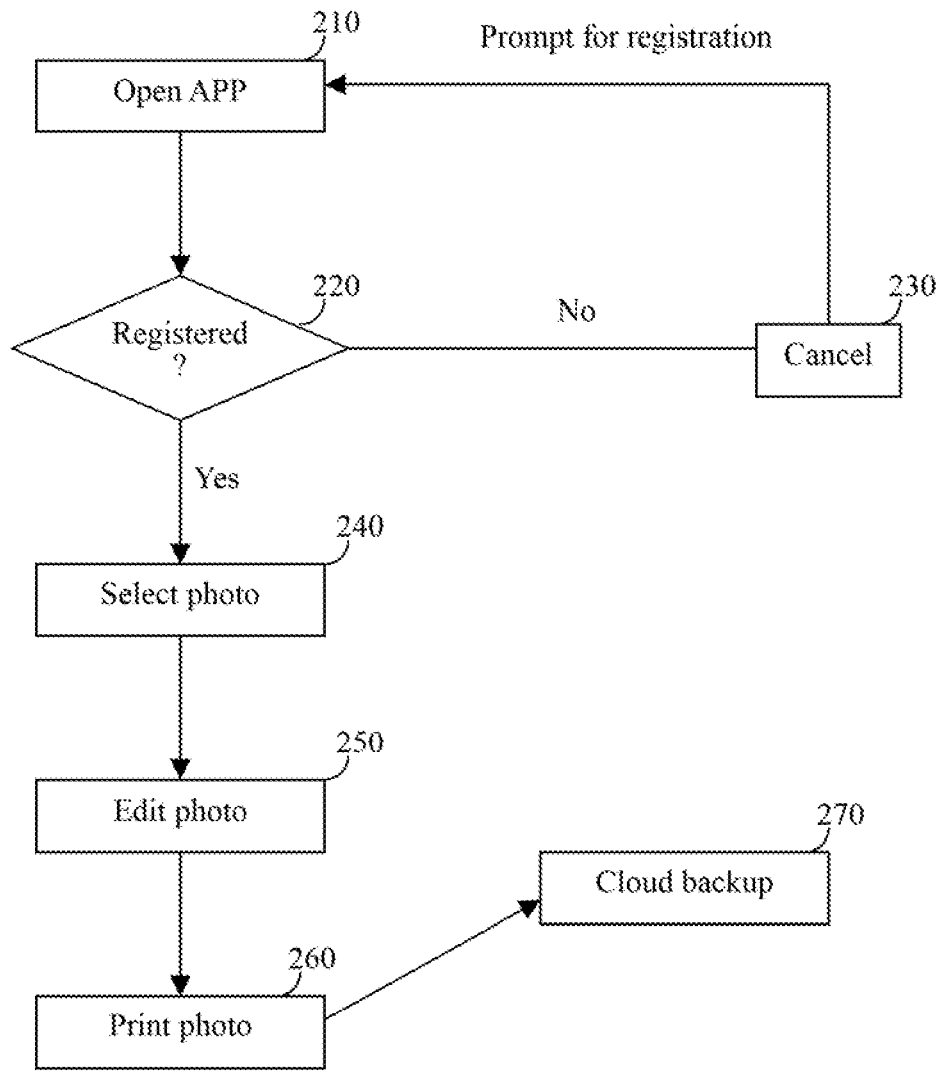
FIG. 2 to FIG. 12 are flow chart illustrating various operation methods according to certain embodiments of the present disclosure.

Refer to FIG. 2 for the main use process of the present application; in Step 210, the user opens the application first; then, in Step 220, the application provides a windows to prompt the user to register as a member, if the user does not register as a member, the method goes to Step 230 for cancellation or provides a trial allowing for a limited number of photograph printing, and then goes back to Step 210. On the other hand, if the user has registered as a member, the user can input the user account and password to log into the application; then in Step 240, the application allow the user to select at least one photograph from the local album in the electronic device or the cloud album in the cloud server; and then in Step 250, the application allows the user to edit the photograph, and the application loads the photograph into the editing area to execute the corresponding image editing according to the editing message inputted by the user. After the completion or abortion of the editing, in Step 260, the application uses the wireless transmission unit of the electronic device to command the portable printer to print the photograph selected by the user account. After the photograph is printed, in Step 270, the application uses the wireless transmission unit to back-up the photograph to the cloud server; if the photograph has been edited, then the photograph and the image editing are backed-up to the cloud server together.

Figure 3:
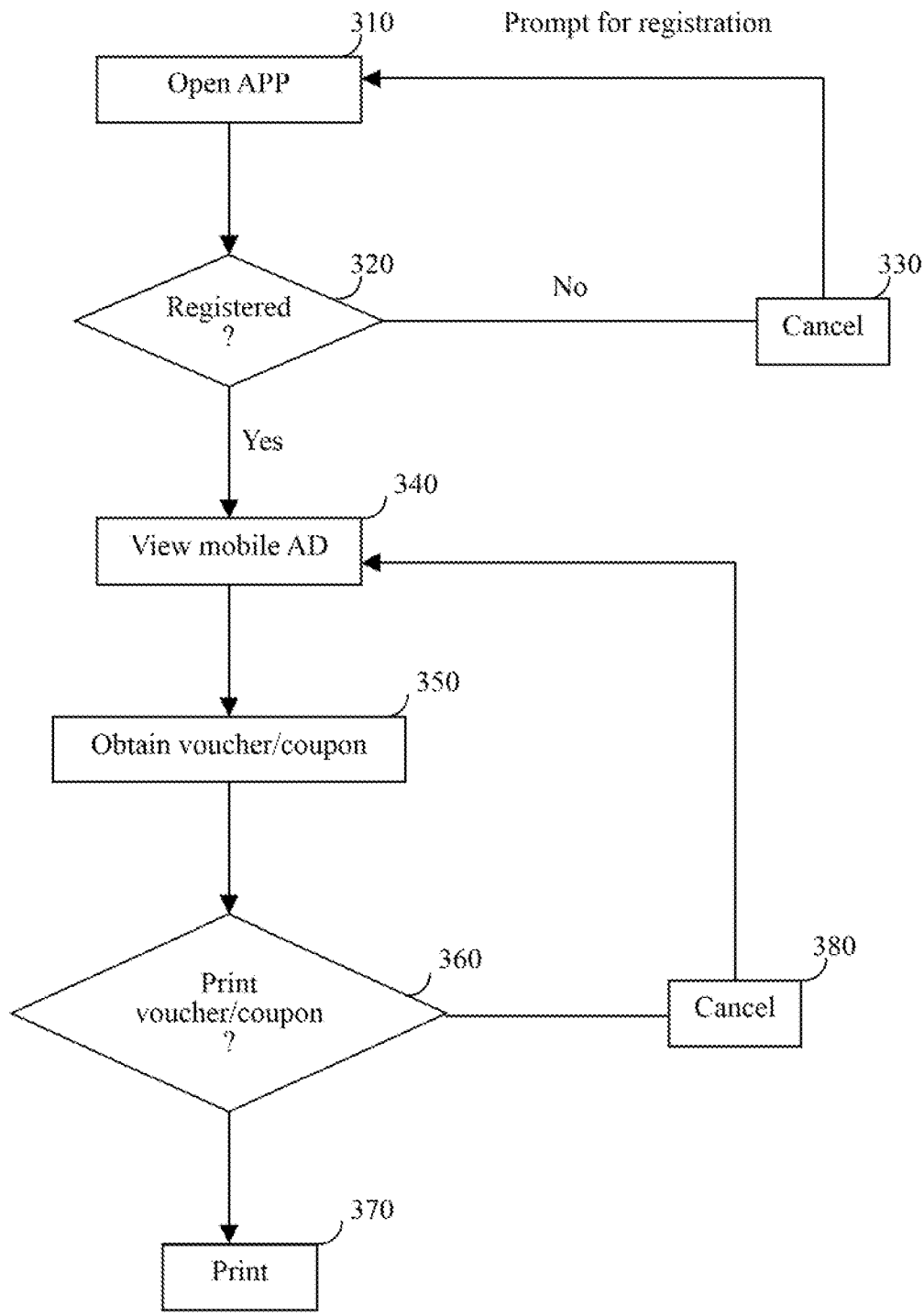

Regarding the process for printing the promotional voucher or coupon, refer to FIG. 3; in Step 310, the user may open the application first; then, in Step 320, the application provides a windows to prompt the user to register as a member, if the user does not register as a member, the method goes to Step 330 for cancellation or provides a trial allowing for a limited number of voucher or coupon printing, and then goes back to Step 310. On the other hand, if the user has registered as a member, the user can input the user account and password to log into the application; then in Step 340, the user can select a mobile advertisement (e.g., a video advertisement or a banner advertisement), and the application receives the selection of the mobile advertisement and plays the mobile advertisement; thereafter, in Step 350, stores a record of promotion information in the user account, in which the promotion information comprises a voucher or a discount coupon. After obtaining the voucher or discount coupon, in Step 360, the application may ask the user whether he/she wants to print the voucher or discount coupon via a prompt window, and if the user chooses to print, the method goes to Step 370, in which the application uses the wireless transmission unit to command the portable printer to print the voucher or discount coupon. On the other hand, if the user chooses not to print, the method goes to Step 380 to cancel the printing and then goes back to Step 340.

Figure 4:
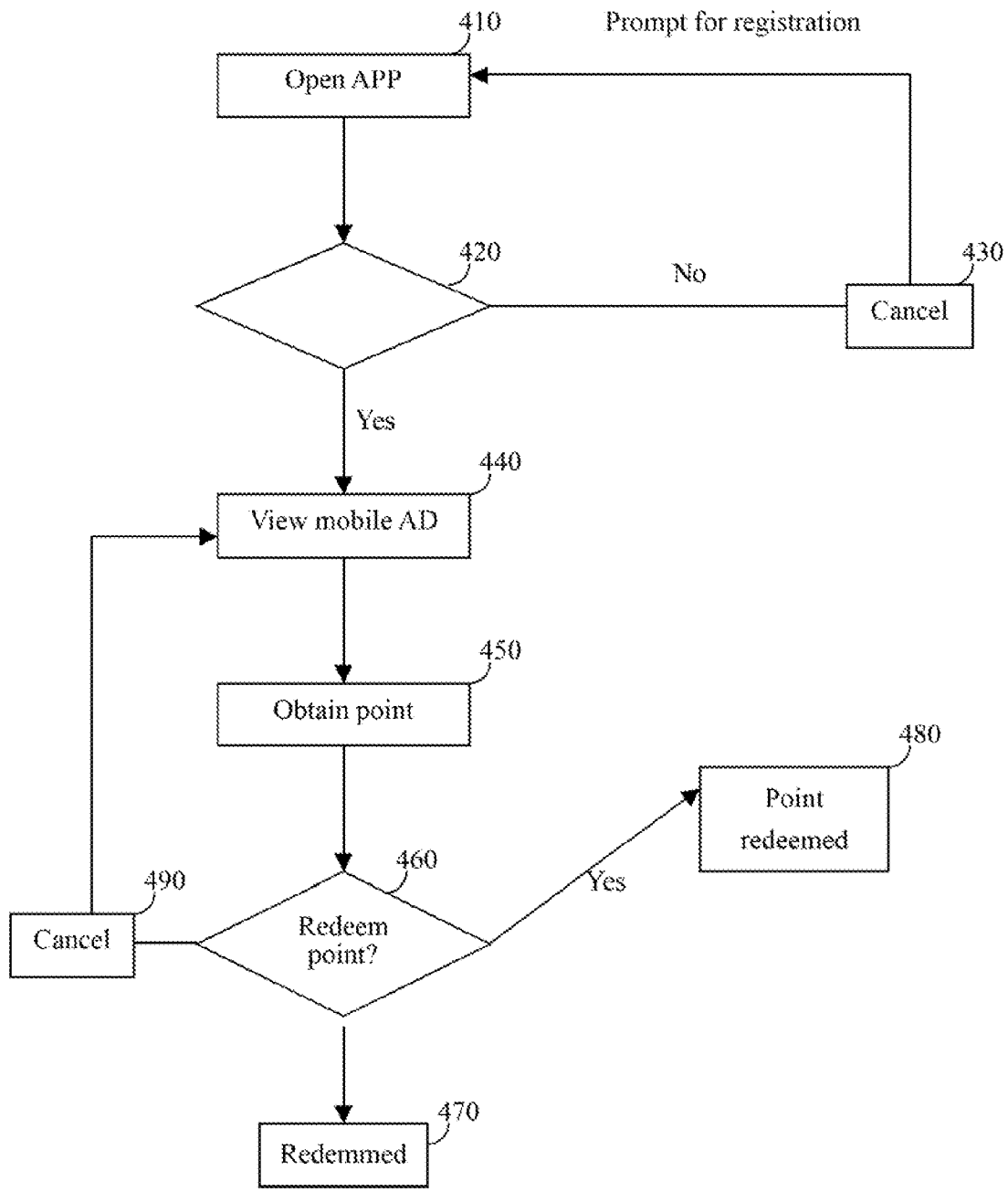

Regarding the use process of the mobile advertisement, refer to FIG. 4; in Step 410, the user opens the application first; then, in Step 420, the application provides a windows to prompt the user to register as a member, if the user does not register as a member, the method goes to Step 430 for cancellation or provides a trial allowing for a limited number of photograph printing, and then goes back to Step 410. On the other hand, if the user has registered as a member, the user can input the user account and password to log into the application; then in Step 440, the user can select a mobile advertisement (e.g., a video advertisement or a banner advertisement), and the application receives the selection of the mobile advertisement and plays the mobile advertisement; next, in Step 450, stores a record of promotion information in the user account, in which the promotion information comprises a point. After obtaining the point, in Step 460, the application can ask the user whether he/she wants to use the point to redeem goods via a prompt window, wherein the goods include, but are not limited to the virtual goods (e.g., stickers) in the application, the consumables (e.g., color ribbons, photograph papers) associated with the portable printer, or any other goods, and when the user choose to print, the method goes to Step 470, in which the application records a point redemption information; and in Step 480, the application uses the wireless transmission unit to upload the point redemption information to the cloud server, and if the user uses the point to redeem the virtual goods, the cloud server sends to the user account the corresponding virtual goods; if the user uses the point to redeem the physical goods, the cloud server notify the logistics company to deliver the goods to the address or store specified by the user account. On the other hand, when the user does not choose to redeem, the method goes to Step 490 to cancel the point redemption, and goes back to Step 440.

Figure 5A:
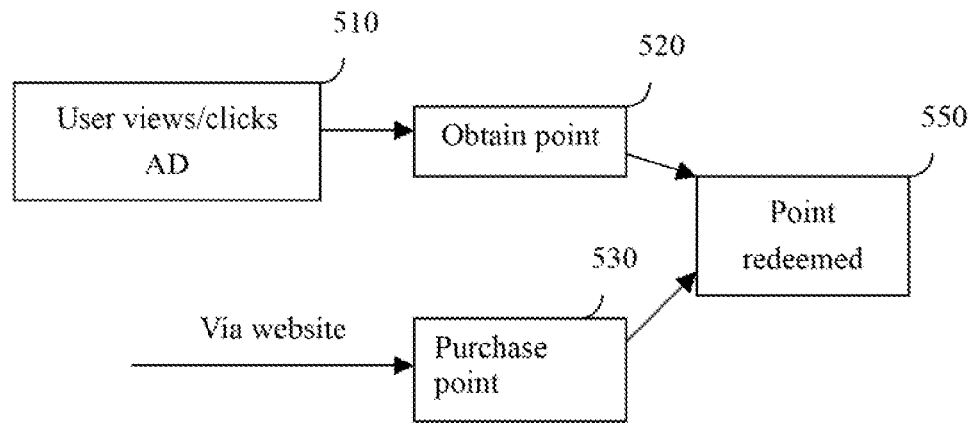

Regarding a further process for point redemption, refer to FIG. 5A; in Step 510, the user can use the application to view an advertisement or click an advertisement; then, in Step 520, the application records the point obtained by the user account; or, in Step 530, the user can purchase the point at a website. After the user obtains or purchase the point, in Step 550, the user can use the application to redeem goods, e.g., virtual goods or printing consumables; however, the present invention is not limited thereto.

Figure 5B:
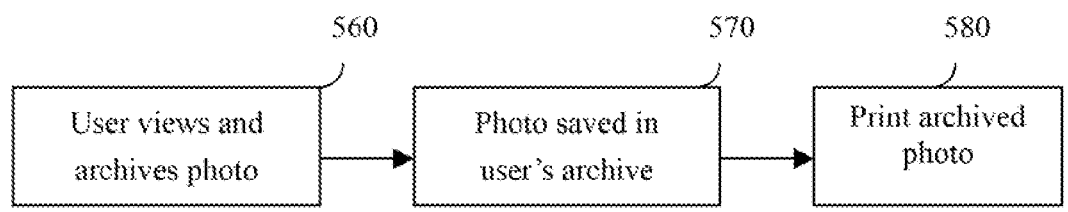

Regarding the use process for archiving the photographs, refer to FIG. 5B; in Step 560, the user views the photographs in the local album or the cloud album, and uses the archiving function in the application; then, in Step 570, the application saves the photograph into the user's archive; and then in Step 580, the application commands the portable printer to printed the archived photograph.

Figure 6:
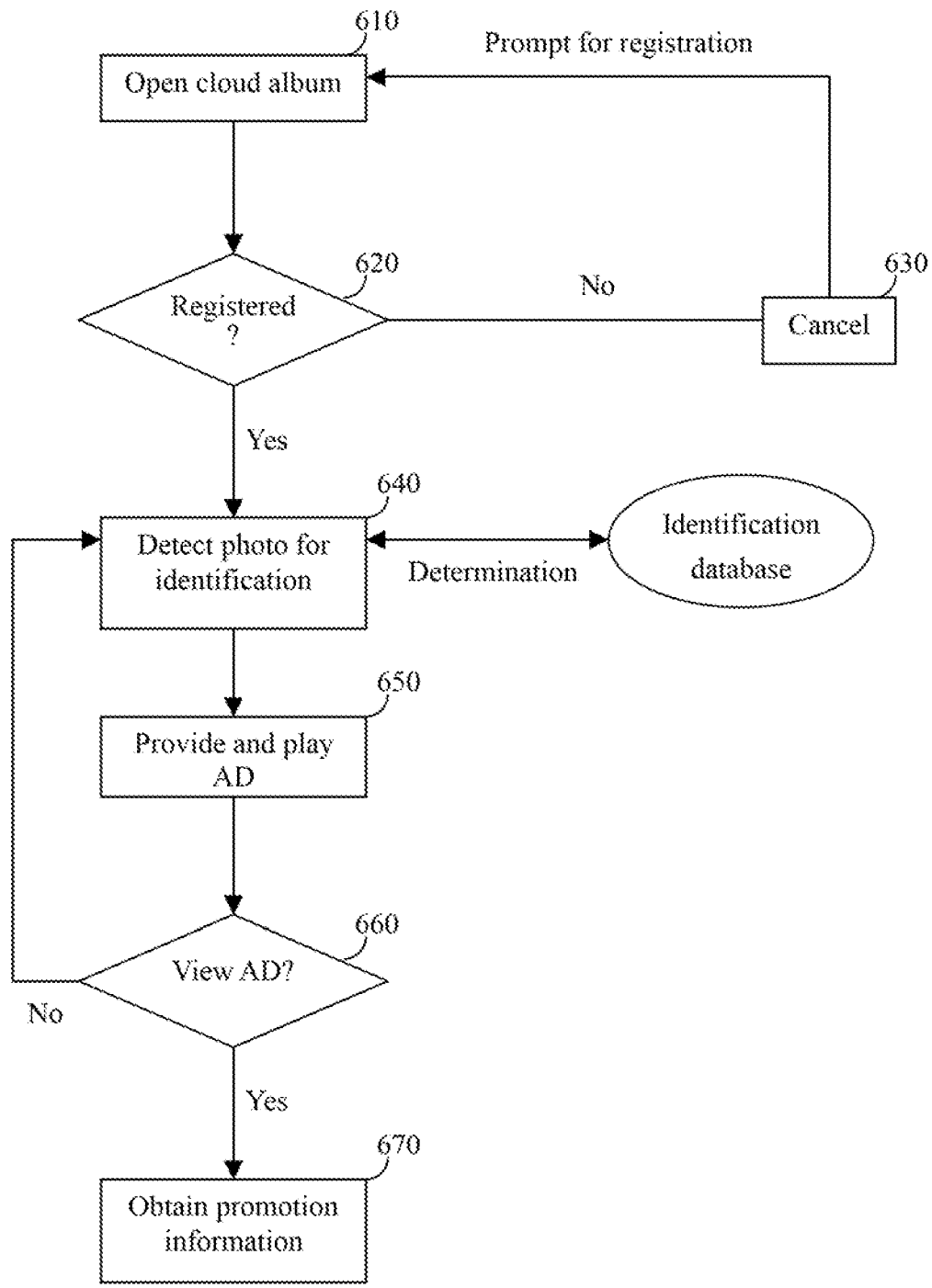

Refer to FIG. 6 for the advertising process based on facial identification; in Step 610, the user opens the application first; then, in Step 620, the application provides a windows to prompt the user to register as a member, if the user does not register as a member, the method goes to Step 630 for cancellation or provides a trial allowing for a limited number of photograph printing, and then goes back to Step 610. On the other hand, if the user has registered as a member, the user can input the user account and password to log into the application; then in Step 640, if the photograph is uploaded to the cloud server, the cloud server connects to an identification database for performing identification on at least one of the following: face, skin texture, figure shape, and one or more objects in the photograph; and then, in Step 650, the cloud server provides a corresponding mobile advertisement to the user account based on the identification result. For example, if a singer is present in the photograph, the cloud server can provides the advertisement of the goods endorsed by the singer to the user account via push notification. In Step 660, the application can let the user decides whether he/she wants to view the advertisement and, if the user chooses to view the advertisement, the method goes to Step 670, in which the application records the promotion information obtained by the user. On the other hand, when the user does not choose to view the advertisement, goes back to Step 640.

Figure 7:
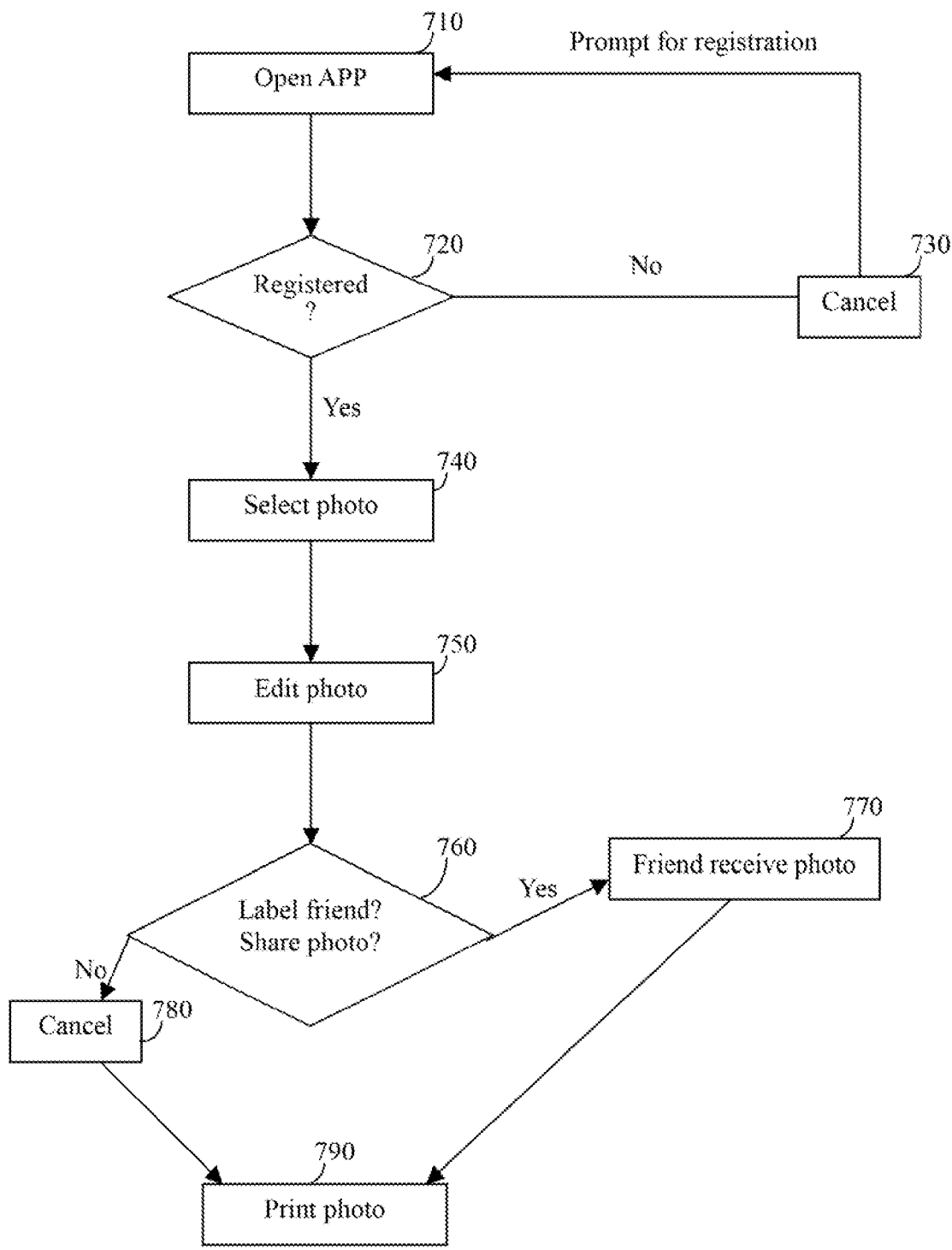

Regarding the use process for tagging friend(s) before printing, refer to FIG. 7; in Step 710, the user opens the application first; then, in Step 720, the application provides a windows to prompt the user to register as a member, if the user does not register as a member, the method goes to Step 730 for cancellation or provides a trial allowing for a limited number of photograph printing, and then goes back to Step 710. On the other hand, if the user has registered as a member, the user can input the user account and password to log into the application; then in Step 740, the application allows the user to select a photograph from the local album in the electronic device or the cloud album in the cloud server; and then, in Step 750, the application allows the user to edit the photograph, in which the application, based on the editing message inputted by the user, to load the photograph into an editing area to perform the corresponding image editing. After the completion or abortion of the editing, in Step 760, the application can allow the user to decide whether he/she wants to tag a friend and share the photograph; if the user decides to tag a friend and share the photograph, the user can manually tags a friend account, or the application can identify the human face in the photograph and automatically tag a corresponding friend account; either way, when the photograph selected by the user account has tagged at least one friend account, in Step 770, the application can use the push notification technique to provide the photograph to the friend account. On the other hand, if the user decides not to tag the friend or share the photograph, the method goes to Step 780 for cancellation. After Step 770 or Step 780 is executed, in Step 790, the application uses the wireless transmission unit of the electronic device to command the portable printer to print the photograph according to the photograph selected by the user account.

Figure 8:
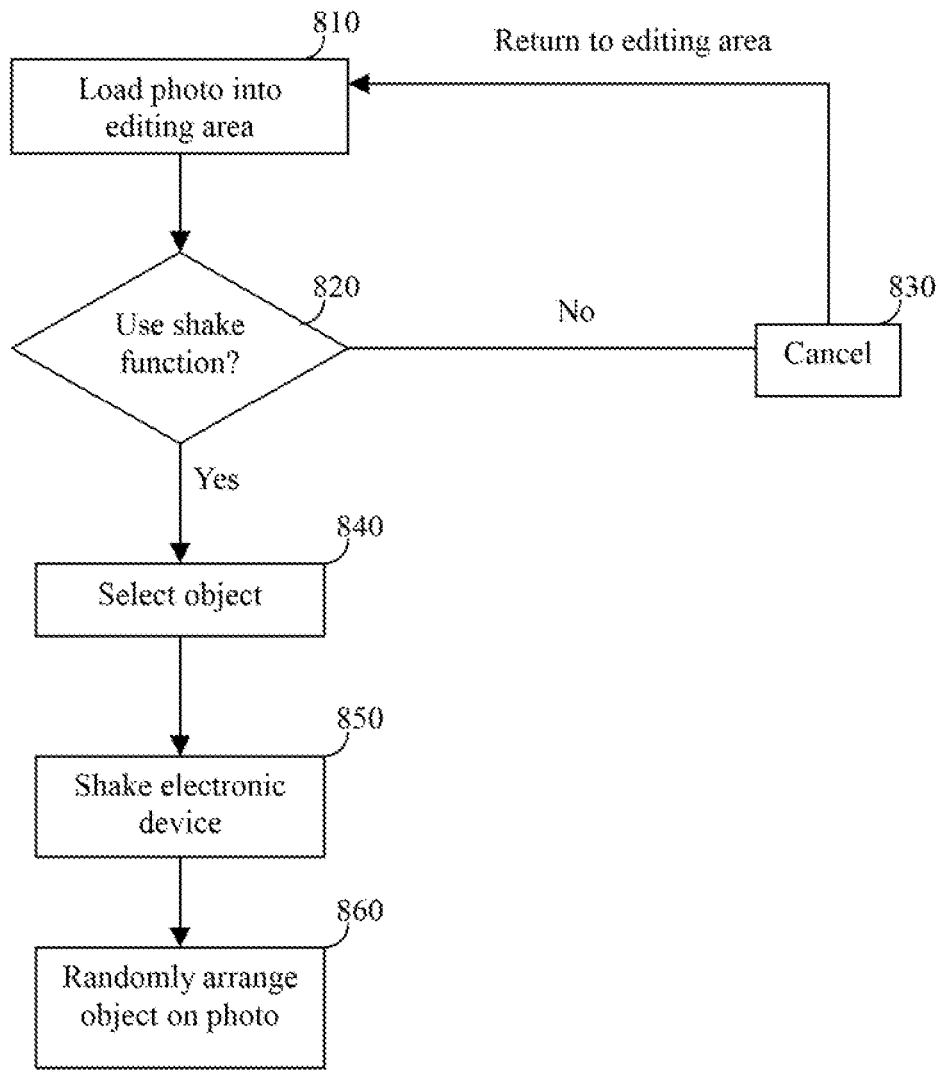

Regarding the use process for the shake function, refer to FIG. 8; in Step 810, the user can use the application to load the photograph into an editing area; then, in Step 820, the application can allow the user to select whether he/she wants to use the shake function, if the user choose not to use the shake function, the method goes to Step 830 for cancellation, and goes back to the editing area in Step 810. On the other hand, if the user uses the shake function, in Step 840, the application allows the user to choose one or more objects (e.g., snowflake, star, heart, etc.); next, in Step 850, the user shakes the electronic device; and then in Step 860, when the application receives a selection of the one or more objects and the orientation detector of the electronic device senses a shaking, the application randomly arranges the one or more objects selected by the user on the photograph, so that the portable printer prints the photograph with the one or more objects on it.

Figure 9:
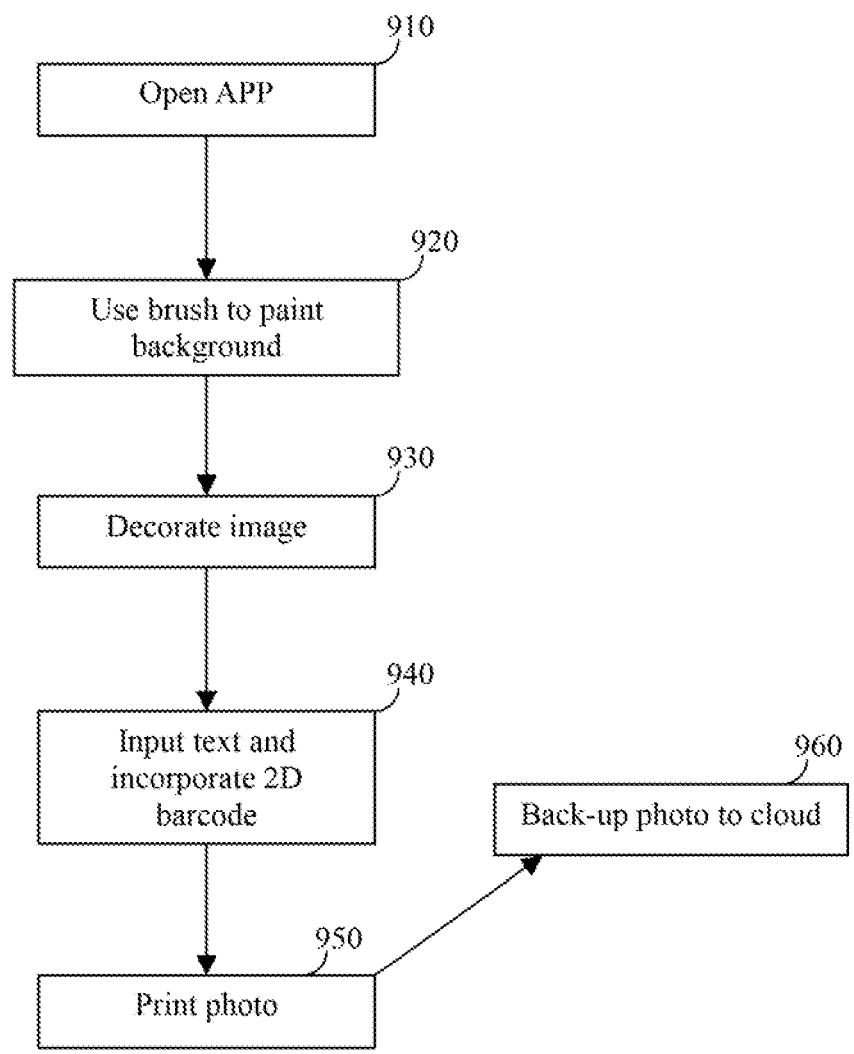

Regarding the process for making the cards, refer to FIG. 9; in Step 910, the user can use the application to load the photograph into the editing area and select the image effect; specifically, in Step 920, uses a brush function to paint the background; next, in Step 930, decorates the image (e.g., stamp/frame/pen brush/roller pen). The user can also input texts in the editing area, in Step 940, the application receives the input of a text and converts the text into a two-dimensional bar code, and then, in Step 950, overlays the image effect, the two-dimensional bar code and the photograph as a picture, so that portable printer prints the picture which can be used as a card or postcard. Moreover, in Step 960, the application uses the wireless transmission unit to back-up the picture to the cloud server.

Figure 10:
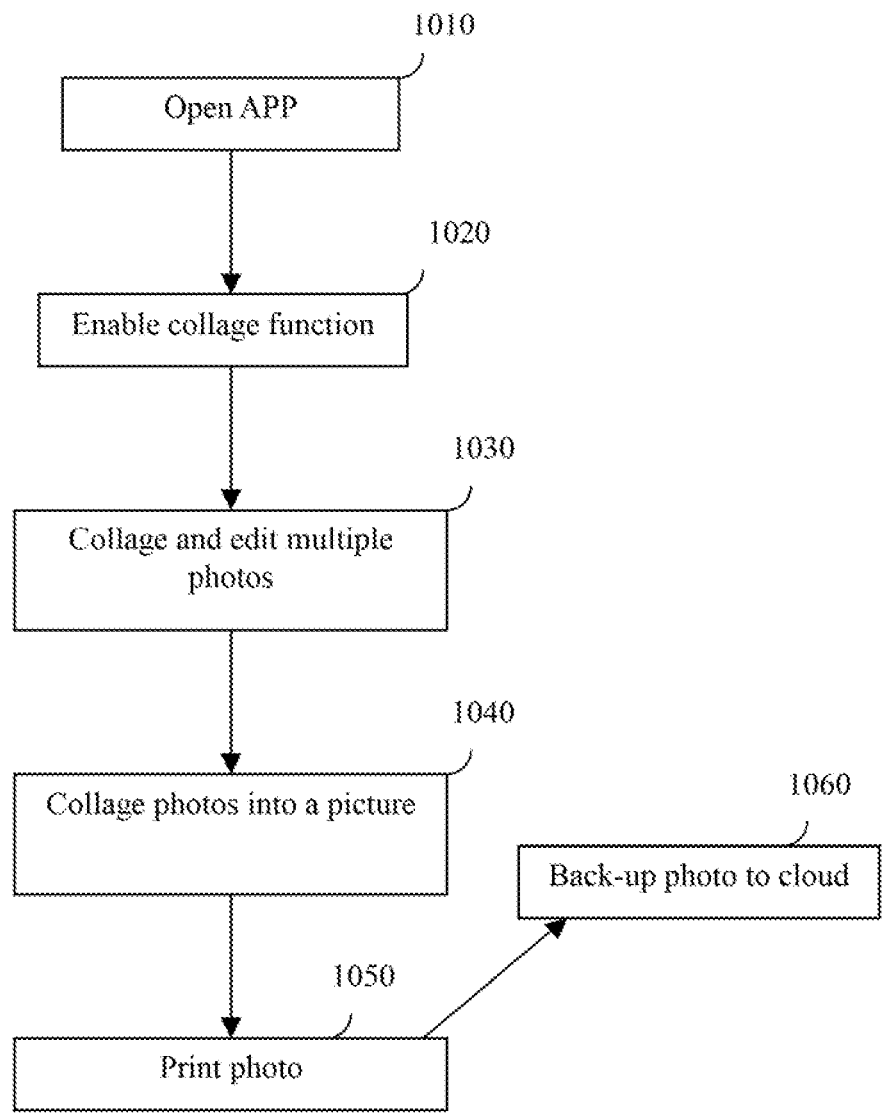

Regarding the process for the collage function, refer to FIG. 10; in Step 1010, the user can uses the application to load multiple photographs into the editing area, in Step 1020, the user enables the collage function in the application; in Step 1030, the user inputs the collaging message, in which the collaging message is used to select a set of photographs from the plurality of photographs for collaging, and uses other functions to assist the editing (e.g., stamp/frame/pen brush/roller pen/two-dimensional bar code/texts); next, in Step 1040, the application collages the photographs into a picture (e.g., comic strip or small card), and then in Step 1050, the portable printer prints the picture. Moreover, in Step 1060, the application uses the wireless transmission unit to back-up the picture to the cloud server.

Figure 11:
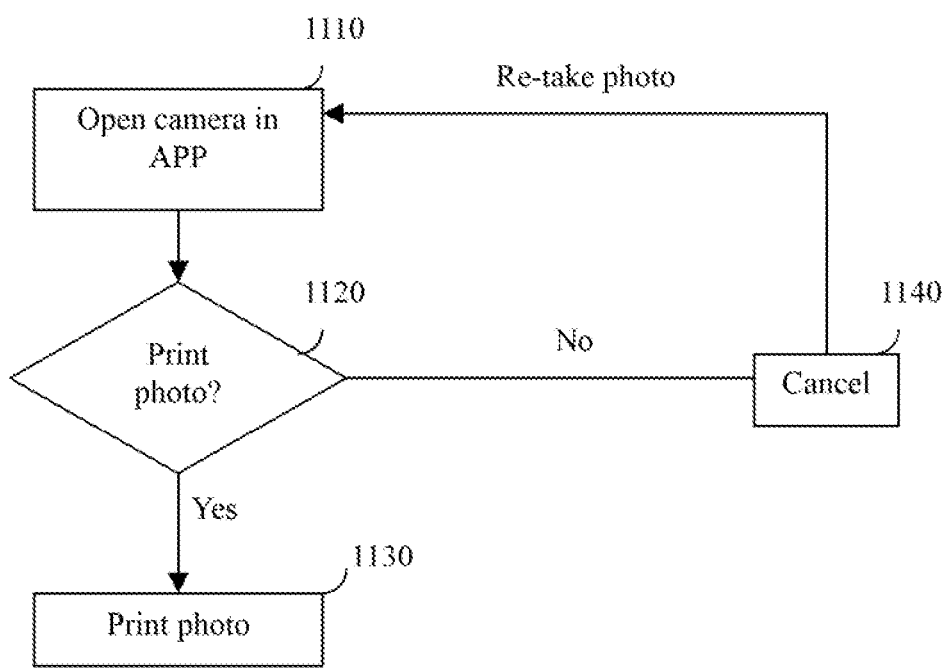

Regarding the fast wireless printing process, refer to FIG. 11; first, in Step 1110, the user can opens the camera function of the application, so as to drive the image-capturing unit in the electronic device to take a photograph, then in Step 1120, the user can use the application to choose whether he/she wants to print this photograph: if the user chooses to print this photograph, in Step 1130, the application uses the wireless transmission unit of the electronic device to command the portable printer to print the photograph. On the other hand, if the user does not choose to print this photograph, the method goes to Step 1140 for cancellation, and goes back to Step 1110 to take another photograph.

Figure 12:
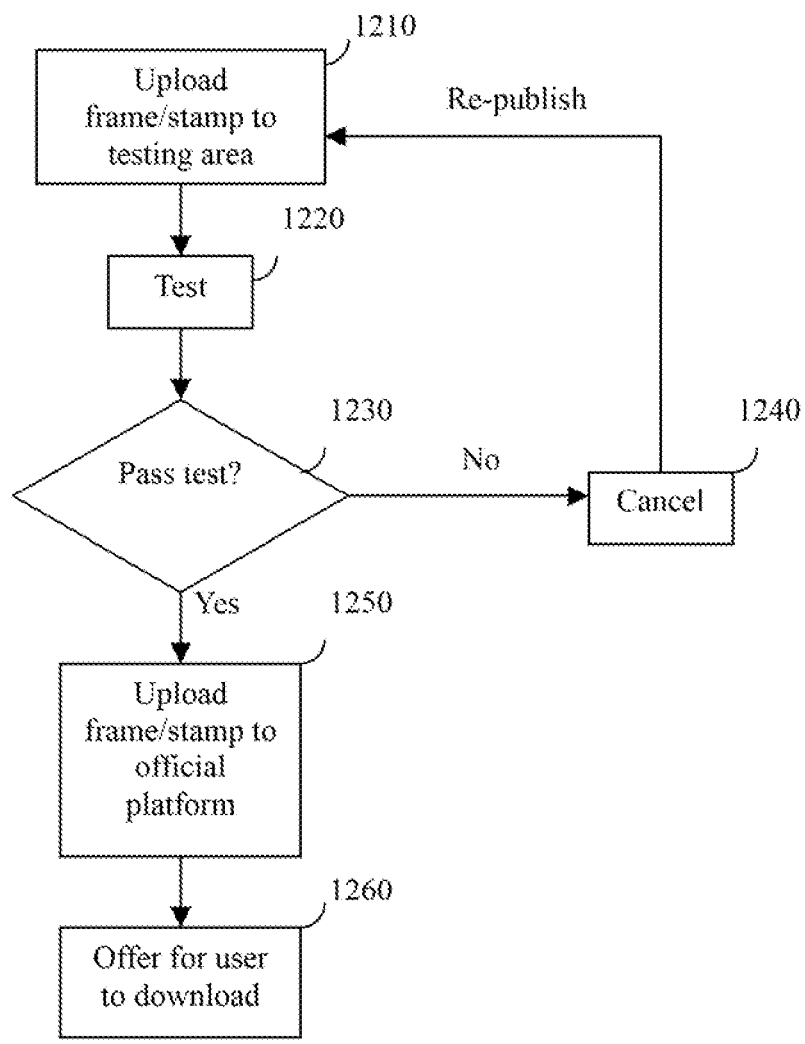

Regarding the process for publishing a stamp/frame, refer to FIG. 12, in Step 1210, the developing personnel uploads the frame, stamp or other object to a testing area; the in Step 1220, multiple testing personnel perform the test; and in Step 1230, the testing personnel determines whether it passes the test; if positive, then in Step 1250, the frame, stamp or other object is uploaded to in the official platform, and then in Step 1260, the frame, stamp or other object is provided for the user to download. On the other hand, if in Step 1230, the frame, stamp, or other object does not pass the test, the method goes to Step 1240 for cancellation, and goes back to Step 1210 for re-publishing.

Although various embodiments of the invention have been described above with a certain degree of particularity, or with reference to one or more individual embodiments, they are not limiting to the scope of the present disclosure. Those with ordinary skill in the art could make numerous alterations to the disclosed embodiments without departing from the spirit or scope of this invention. Accordingly, the protection scope of the present disclosure shall be defined by the accompany claims.

What is claimed is:

1. An electronic device, comprising:
a wireless transmission unit;
a storage unit, storing at least one photograph and an application {APR;
a processing unit, electrically connected to the storage unit and the wireless transmission unit, and configured to execute the application, and after a user account associated with the application is logged in, use the wireless transmission unit to command a portable printer to print the photograph according to the photograph selected by the user account;
an input unit, electrically connected to the processing unit, and configured to receive a selection of a mobile advertisement;
a display unit, electrically connected to the processing unit, configured to play the mobile advertisement, wherein when the mobile advertisement is selected or played, the application stores a record of promotion information in the user account, wherein the promotion information comprises at least one of a point, a voucher and a discount coupon, wherein the point is utilized to redeem goods, wherein the processing unit uses the wireless transmission unit to command the portable printer to print the voucher or the discount coupon, wherein when the input unit receive an editing message, the application loads the photograph into an editing area to execute a corresponding image editing, the processing unit uses the wireless transmission unit to back-up the photograph together with the image editing to a cloud server; and an orientation detector, electrically connected to the processing unit, wherein after the photograph is loaded into the editing area, when the input unit receives a selection of objects, and when the orientation detector senses a shaking, the objects are randomly arranged on the photograph by the application, so that the portable printer prints the photograph with the one or more objects.

2. The electronic device of claim 1, wherein the application further adds up the point according to a number of printing times of the portable printer.

3. The electronic device of claim 1, wherein after the photograph is printed, the processing unit uses the wireless transmission unit to back-up the photograph to a cloud server.

4. The electronic device of claim 3, wherein the cloud server is connected with an identification database to identify at least of the following: face, skin texture, figure shape, and objects in the photograph, so as to provide the user account a corresponding mobile advertisement.

5. The electronic device of claim 4, wherein when the photograph selected by the user account tags at least one friend account, the application provides the photograph to the friend account, and the cloud server provides the corresponding mobile advertisement to the friend account.

6. The electronic device of claim 1, wherein after the photograph is loaded into the editing area, the input unit receives a selection of an image effect and an input of a text, and the application converts the text into a two-dimensional bar code, so as to overlay the image effect, the two-dimensional bar code, and the photograph into a picture, so that the portable printer prints the picture.

7. The electronic device of claim 1, wherein the number of the photograph stored in the storage unit is at least two, and the input unit receive a collaging message, wherein the collaging message is used to select a set of photographs from the plurality of photographs and collage the set of photographs into a picture, so that the portable printer prints the picture.

8. A non-transitory computer readable product, including instructions that, when access by a processing unit, perform the operation method, the operation method comprising:

after a user account is logged in, receiving a selection of a mobile advertisement;

when the mobile advertisement is selected or played, storing a record of promotion information in the user account, wherein the promotion information comprising at least one of a point, a voucher and a discount coupon, wherein the point is utilized to redeem goods;

using a wireless transmission unit to command a portable printer to print the voucher or the discount coupon:

using the wireless transmission unit of the electronic device to command the portable printer to print at least one photograph selected by the user account loading the photograph into an editing area to execute a corresponding image editing, according to an editing message; and using the wireless transmission unit to back-up the photograph together with the image editing to a cloud server; and after the photograph is loaded into the editing area, and when a selection of objects is received and a shaking is sensed by an orientation detector, randomly arranging the objects on the photograph, so that the portable printer prints the photograph with the one or more objects.

9. The computer product of claim 8, wherein the operation method further comprises:

adding up the points according to a number of printing times of the portable printer.

10. The computer product of claim 8, wherein the operation method further comprises:

using the wireless transmission unit to back-up the photograph to a cloud server after the photograph is printed.

11. The computer product of claim 10, wherein the cloud server is connected with an identification database to identify at least of the following: face, skin texture, figure shape, and one or more objects in the photograph, so as to provide the user account a corresponding mobile advertisement.

12. The computer product of claim 11, wherein the operation method further comprises:

when the photograph selected by the user account tags at least one friend account, using the friend account to provide the photograph, so that the cloud server provides the corresponding mobile advertisement to the friend account.

13. The computer product of claim 8, wherein the operation method further comprises:

receiving a selection of an image effect and an input of a text, after the photograph is loaded into editing area;

converting the texts into a two-dimensional bar code; and overlaying the image effect, the two-dimensional bar code, and the photograph into a picture, so that the portable printer prints the picture.

14. The computer product of claim 8, wherein the number of the photograph stored in the storage unit is at least two, and the operation method further comprises:

receiving a collaging message, wherein the collaging message is used to select a set of photographs from the plurality of photographs and collage the set of photographs into a picture, so that the portable printer prints the picture.

* * * * *